United States Patent [19]

Mukai et al.

[11] Patent Number: 5,788,010
[45] Date of Patent: Aug. 4, 1998

[54] ELECTRIC POWER STEERING APPARATUS

[75] Inventors: Yoshinobu Mukai; Shinzi Hironaka; Yoshiki Noro, all of Wako, Japan

[73] Assignee: Honda Giken Kogyo Kabushiki Kaisha, Tokyo, Japan

[21] Appl. No.: 644,901

[22] Filed: May 10, 1996

[30] Foreign Application Priority Data

Jun. 7, 1995 [JP] Japan .................... 7-140942

[51] Int. Cl.$^6$ ............................ B62D 5/04
[52] U.S. Cl. ............... 180/446; 180/443; 701/42
[58] Field of Search ................. 180/443, 446, 180/423; 701/41, 42

[56] References Cited

U.S. PATENT DOCUMENTS

| | | | |
|---|---|---|---|
| 5,040,629 | 8/1991 | Matsuoka et al. | 180/446 |
| 5,053,966 | 10/1991 | Takahashi et al. | 180/446 |
| 5,097,420 | 3/1992 | Morishita | 180/446 |
| 5,182,711 | 1/1993 | Takahashi et al. | 180/446 |
| 5,201,818 | 4/1993 | Nishimoto | 180/446 |
| 5,257,828 | 11/1993 | Miller et al. | 180/446 |
| 5,428,537 | 6/1995 | Kamono et al. | 180/446 |
| 5,473,231 | 12/1995 | McLaughlin et al. | 180/446 |
| 5,482,129 | 1/1996 | Shimizu | 180/446 |

*Primary Examiner*—Daniel G. DePumpo
*Attorney, Agent, or Firm*—Merchant, Gould, Smith, Edell, Welter & Schmidt, P.A.

[57] ABSTRACT

An electric power steering apparatus, which provides a steering assist of an electric motor directly to a vehicle steering system to reduce necessary steering power to be applied by a vehicle driver, is provided with a control unit which includes a proportion-coefficient and integration-coefficient setting section for, on the basis of a velocity of the vehicle detected by a velocity sensor, setting sensitivity of a proportioning element and integration gain of an integrating element in such a manner that they take greater values during high-velocity running of the vehicle than during low-velocity running of vehicle. This prevents occurrence of unwanted noises and vibrations during low-velocity running of the vehicle and also enhances steering response during high-velocity running of the vehicle, thus always providing an optimum steering feeling in changing running conditions of the vehicle. The control unit may further include a compensation section provided between an offset calculation section and a proportional and integral control section for, on the basis of the velocity detected by the velocity sensor, modifying the offset signal in such a manner that the offset signal takes a greater value during high-velocity running of the vehicle than during low-velocity running of vehicle.

6 Claims, 8 Drawing Sheets

ELECTRIC POWER STEERING APPARATUS

BACKGROUND OF THE INVENTION

1. Field of the Invention:

The present invention relates generally to electric power steering apparatuses for use with an automotive vehicle which provide a steering assist of an electric motor directly to a vehicle steering system to substantially reduce steering power to be applied manually by a vehicle driver, and more particularly to an electric power steering apparatus which is capable of preventing occurrence of unwanted noises and vibrations in a vehicle steering system during low-velocity running of the vehicle and achieving an enhanced response of the steering system to a driver's steering operation during high-velocity running of the vehicle.

2. Description of the Related Art:

Electric power steering apparatuses for use with an automotive vehicle have conventionally been known, which set a target current for driving a vehicle's electric motor on the basis of detection of steering torque produced by a vehicle driver operating the steering wheel, and then apply PI (proportional and integral) or PID (proportional and integral and derivative) control to an offset signal indicative of an offset between the target current and a motor current actually flowing through the motor. Thus, the motor is driven, by a motor control signal (e.g., PWM signal) obtained from the PI- or PID-controlled offset signal, so as to provide an appropriate steering assist to the steering system. In such conventional electric power steering apparatuses, the offset signal is controlled to quickly decrease to a value "0" because of the arrangement that the motor current signal is fed back (negative feedback) to the target current signal for PI or PID control.

FIG. 7 is a block diagram of principal parts of a typical prior art electric power steering apparatus, which is for example based on PI (proportional and integral) control.

As shown in FIG. 7, the electric power steering apparatus 50 comprises a steering torque sensor 12, a vehicle velocity sensor 14, a control unit 51, a motor drive section 16, a motor current detection section 18 and an electric motor 10. The control unit 51, essentially comprising a microprocessor and memory, includes a target current setting section 52, an offset calculation section 53, a PI control section 54 and a control signal generation section 55.

The steering torque sensor 12 generates analog steering torque signal TS indicative of current steering torque generated by a vehicle driver maneuvering a steering wheel (not shown) and supplies the torque signal TS to the target current setting section 52. The vehicle velocity sensor 14 generates velocity signal VS in the form of electrical pulses of a frequency corresponding to a current velocity of the vehicle, and supplies the velocity signal VS to the target current setting section 52.

The target current setting section 52 converts the steering torque signal TS supplied from the sensor 12 into a digital steering torque signal TD. Then, in accordance with a predetermined characteristic curve, the section 52 sets target current IMS on the basis of the digital steering torque signal TD and vehicle velocity signal VS supplied from the velocity sensor 14. Thus, the target current setting section 52 supplies the offset calculation section 53 with target current signal IMS having a value that corresponds to a value of the torque signal TD in accordance with the predetermined characteristic curve.

FIG. 8 is a graphic representation of the predetermined target current signal (IMS) versus steering torque signal (TD) characteristic curve, which is plotted with the vehicle velocity used as a parameter.

In FIG. 8, reference characters "VL", "VM" and "VH" represents low, medium and high vehicle velocity regions, respectively, and target current signal (IMS) is preset to decrease in value as vehicle velocity VS increases (e.g., from "VL" through "VM" to "VH") even when steering torque signal TD remains in the same value.

Namely, the target current setting section 52 outputs target current signal IMS inversely proportional to vehicle velocity VS in accordance with the predetermined characteristic curve. Thus, for the low vehicle velocity region (VS=VL), the electric motor 10 is driven by large motor current IM corresponding to large target current signal IMS to thereby provide a sufficiently large steering assist, while for the high vehicle velocity region (VS=VH), the electric motor is driven by small motor current IM corresponding to small target current signal IMS to thereby provide a small steering assist for stabilized steering operation.

The offset calculating section 53 calculates an offset between the target current signal IMS and a digital motor current signal IMO and supplies an offset signal $\Delta I(=IMS-IMO)$ to the PI control section 54. The PI control section 54 comprises a proportioning element for multiplying the offset signal $\Delta I$ by sensitivity KP, and an integrating element, connected in parallel with the proportioning element, for integrating the offset signal $\Delta I$ by integration gain K1. Thus, the PI control section 54 performs proportional and integral operations on the offset signal $\Delta I$ to generate a proportion/integration signal IPI, which is supplied to the control signal generation section 55.

The proportion/integration signal IPI generated by the PI control section 54 may be represented by the following equation using the sensitivity KP and integration gain K1:

$$IPI = KP * \Delta I + (KI/p) * \Delta I, \qquad \text{Equation (1)}$$

where p is a Heaviside operator. By setting the sensitivity KP and integration gain K1 to large values, the motor current signal IMO (corresponding to the motor current IM) can quickly become equal to the target current signal IMS ($\Delta I=1$).

The control signal generation section 55, including a PWM (pulse width modulation) signal generator, generates PMW signal PWM which is passed to a motor drive section 16 as motor control signal VO. The motor drive section 16 in turn generates a motor voltage VM to drive the electric motor 10. Once the motor 10 is driven by the motor control signal VO and motor current IM starts flowing, the motor current detection section 18 detects the motor current IM so that motor current signal IMO corresponding to the motor current IM is fed back to the offset calculation section 53.

Because the motor current signal IMO corresponding to the motor current IM is fed back (negative feedback) to be subtracted from the target current signal IMS so as to provide offset signal $\Delta I$ and the offset signal $\Delta I$ is then subjected to PI control, the above-mentioned prior art apparatus 50 allows the motor current signal to quickly become equal to the target current signal IMS, so that the motor 10 outputs power corresponding to the steering torque. As a result, a desired steering assist with a quick response can be applied to the steering system.

However, because the sensitivity KP and integration gain KI in the PI control unit 54 are fixedly set with respect to the vehicle velocity, the vehicle behaves differently between a time when it is running at a low velocity VL and a time when it is running at a high velocity VH, and the prior art electric power steering apparatus 50 would encounter the following problems.

Namely, when the vehicle is running at a low velocity VL, the target current signal IMS is set to a great value as shown in FIG. 8. Thus, if the sensitivity KP and integration gain KI are increased, gain of the control unit 51 would become greater than necessary, so that unwanted noises and vibrations occur in the steering system, degrading the performance of the apparatus. On the other hand, when the vehicle is running at a high velocity VH, the target current signal IMS is set to a smaller value as shown in FIG. 8. Thus, if the sensitivity KP and integration gain KI are decreased, response of the control unit 51 would be delayed so that it takes longer time for the steerable wheels to move in response to the vehicle driver's operation of the steering wheel. This degrades the steering response and hence steering feeling.

In general, when the vehicle is not in motion or running at a low velocity, a large steering assist is required and it is required to reduce noises and vibrations occurring in the steering system, but some delay in the steering response is not so critical. However, when the vehicle is running at a high velocity, a quick steering response is required although no large steering assist is required, and noises and vibrations occurring in the steering system generally do not present great problems because they are masked by road noises, etc.

SUMMARY OF THE INVENTION

It is therefore an object of the present invention to provide an electric power steering apparatus which can prevent occurrence of unwanted noises and vibrations during low-speed running of a vehicle and also achieve an enhanced steering response during high-speed running of the vehicle, thus always providing an optimum steering feeling in various running conditions of the vehicle.

In order to accomplish the above-mentioned object, an electric power steering apparatus for use with an automotive vehicle according to one aspect of the present invention comprises a steering torque sensor for detecting steering torque caused by a steering system of the vehicle, a velocity sensor for detecting a velocity of the vehicle, an electric motor for applying a steering assist to the steering system, and a control unit. The control unit includes a target current setting section for, on the basis of the steering torque detected by the steering torque sensor, setting a target current to drive the motor, a motor current detection section for detecting a motor current actually flowing through the motor, and a proportional and integral control section having proportioning and integrating elements for controlling the motor on the basis of an offset between the target current set by the setting section and the motor current detected by the motor current detection section. The control unit further includes a proportion-coefficient and integration-coefficient setting section for, on the basis of the velocity detected by the velocity sensor, setting sensitivity of the proportioning element and integration gain of the integrating element in such a manner that the sensitivity and integration gain take greater values during high-velocity running of the vehicle than during low-velocity running of vehicle.

The electric power steering apparatus arranged in the above-mentioned manner can prevent occurrence of unwanted noises and vibrations during low-velocity running of the vehicle and also achieve an enhanced steering response during high-velocity running of the vehicle, thus always providing an optimum steering feeling in various running conditions of the vehicle. The proportion-coefficient and integration-coefficient setting section may set the proportion and integration coefficients that vary in response to the velocity detected by the velocity sensor.

Further, apparatus according to another aspect of the present invention, the control unit includes, in place of the proportion-coefficient and integration-coefficient setting section, a compensation section provided between an offset calculation section which calculates an offset between the target current and the detected motor current, and the proportional and integral control section. The compensation section modifies the offset signal output from the calculation section, on the basis of the velocity detected by the velocity sensor, in such a manner that the offset signal takes a greater value during high-velocity running of the vehicle than during low-velocity running of vehicle.

Instead of the single compensation section being provided between the offset calculation section and the proportional and integral control section, two such compensation sections may be provided. A first compensation section may be provided between the target current setting section and the offset calculation section. A second compensation section may be provided between the motor current detection section and the offset calculation section. The compensation sections modify the target current signal and motor current signal, on the basis of the velocity detected by the velocity sensor, in such a manner that these signals take greater values during high-velocity running of the vehicle than during low-velocity running of vehicle. The compensation section or sections may generate compensation coefficients that vary in response to the velocity detected by said velocity sensor.

The above-mentioned arrangements based on the compensation section or sections can also prevent occurrence of unwanted noises and vibrations during low-velocity running of the vehicle and also achieve an enhanced steering response during high-velocity running of the vehicle, thus always providing an optimum steering feeling in various running conditions of the vehicle.

BRIEF DESCRIPTION OF THE DRAWINGS

The above and other objects and advantages of the present invention will become apparent from the following detailed description of the preferred embodiments when read in conjunction with the accompanying drawings, in which.

DETAILED DESCRIPTION OF THE PREFERRED EMBODIMENTS

Figure 1:
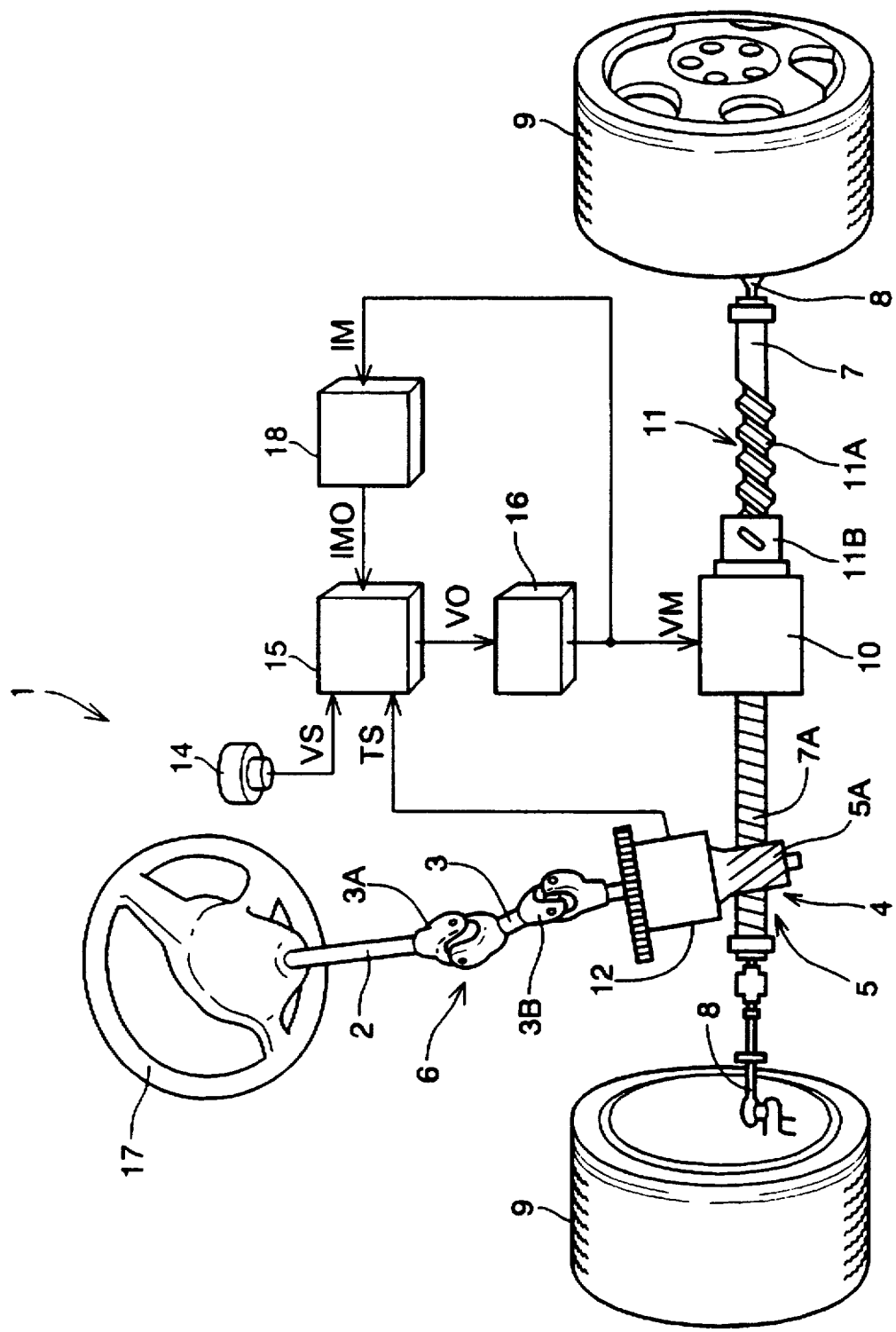
FIG. 1 is a block diagram showing the general structure of an electric power steering apparatus according to one embodiment of the present invention.

FIG. 1 is a block diagram showing the general structure of an electric power steering apparatus according to one embodiment of the present invention.

In FIG. 1, the electric power steering apparatus 1 comprises a manual steering power generation unit 6, which includes a steering shaft 2 that is connected at one end to a steering wheel 17 and connected at the other end to a pinion 5A of a rack and pinion set 5 via a connecting shaft 3 having universal joints 3A and 3B mounted on opposite end thereof. The pinion 5A is in meshing engagement with a toothed rack 7A, and rack shaft 7 reciprocatively movable through the meshing engagement between the pinion 5A and rack 7A is connected at opposite ends to left and right steerable front wheels 9 via tie rods 8. Thus, in response to the driver's steering operation of the wheel 17, the front wheels 9 are driven to vary the running direction of the vehicle through the rack-and-pinion-based manual steering power generation unit 6.

In order to reduce the amount of steering power that has to be produced by the manual steering power generation unit 6, an electric motor 10 for supplying a steering assist is connected coaxially with the rack shaft 7, and the supplied steering assist is converted, via a ball thread mechanism 11 provided coaxially with the rack shaft 7, into thrust that is applied to the rack shaft 7 (ball thread shaft 11A).

Steering torque sensor 12 is contained in a steering gear box 4 and detects a direction and intensity of manual steering power applied by the vehicle driver. Analog steering torque signal TS indicative of the steering torque detected by the sensor 12 is supplied to a control unit 15. Vehicle velocity sensor 14 generates a velocity signal VS in the form of electrical pulses of a frequency corresponding to a current velocity of the vehicle, and supplies the velocity signal VS to the control unit 15.

The control unit 15, essentially comprising a microprocessor and memory, generates a motor control signal VO (e.g., combination of a trigger signal and PWM signals) to drive a motor drive section 16. As will be described later, the control unit 15 also includes a proportional and integral (PI) control section 23, and a proportion-coefficient and integration-coefficient setting section (in the figure, "PI coefficients setting section") 28 for generating coefficients that increase in value as the value of the vehicle velocity signal VS increases. Sensitivity of the proportioning element and integration gain of the integrating element are changed by the coefficients generated by the proportion-coefficient and integration-coefficient setting section 28, so as to achieve a steering characteristic suited to the vehicle velocity.

The motor drive section 16 comprises a bridge circuit composed of four switching elements such as power FETs (field effect transistors) and generates a motor voltage VM on the basis of the motor control signal VO so that the motor 10 is driven by the motor voltage VM. Motor current detection section 18 detects a motor current IM and feeds motor current signal IMO indicative of the detected motor current IM back to the control unit 15 (negative feedback).

Figure 2:
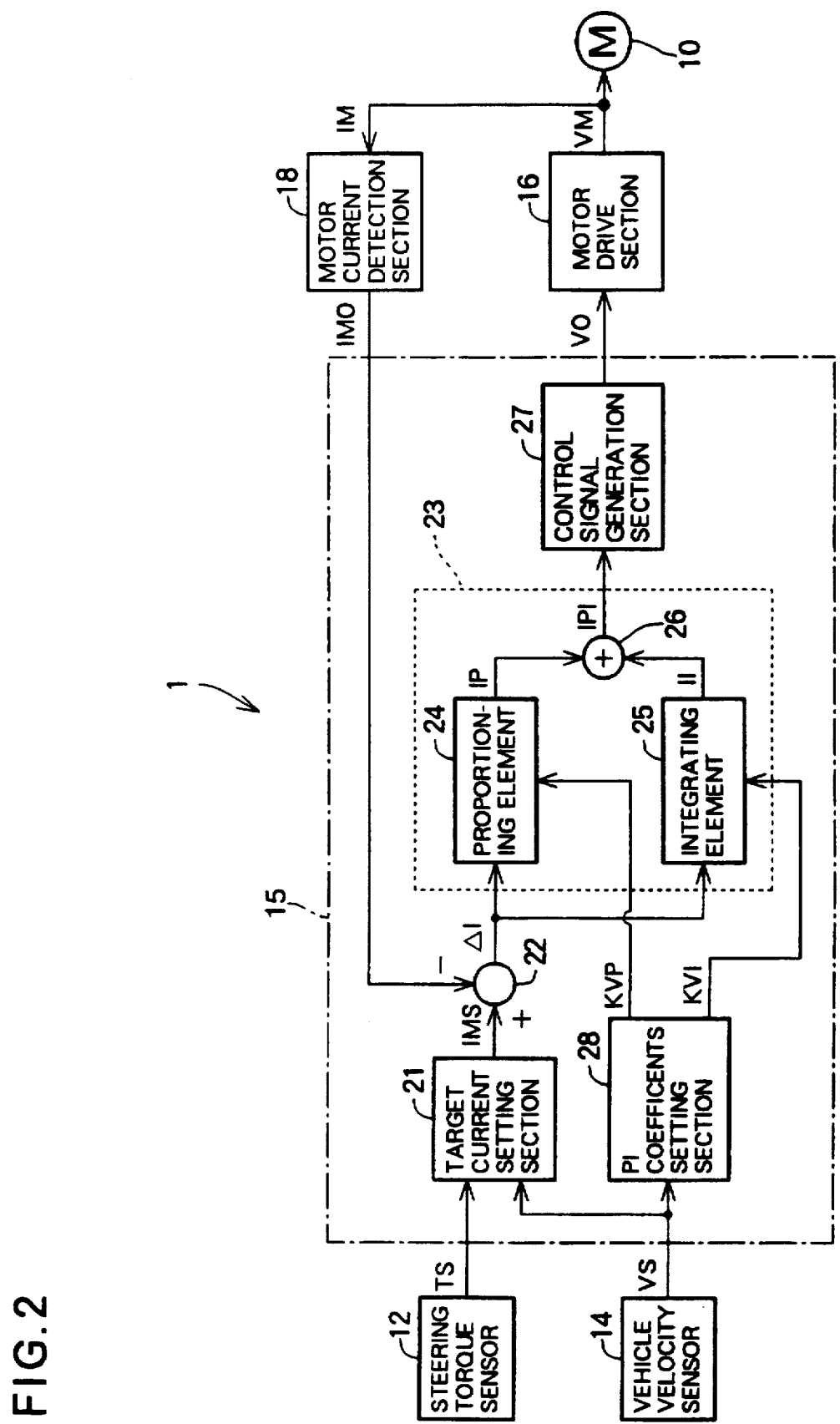
FIG. 2 is a block diagram showing principal parts of the electric power steering apparatus of FIG. 1.

FIG. 2 is a block diagram showing principal parts of the electric power steering apparatus of FIG. 1, where the control unit 15 includes a target current setting section 21, an offset calculation section 22, the PI control section 23, a control signal generation section 27 and the proportion-coefficient and integration-coefficient setting section 28.

Figure 7:
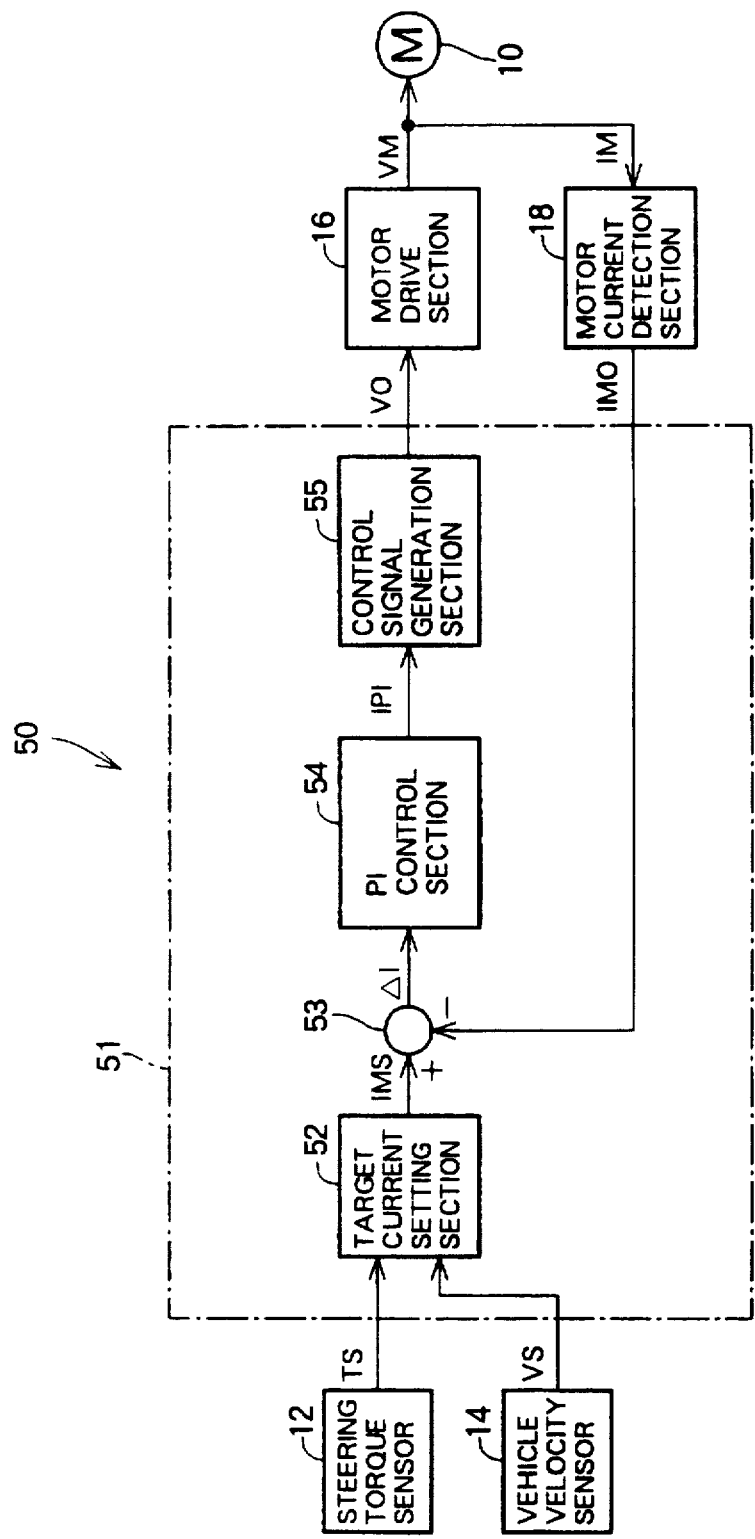
FIG. 7 is a block diagram showing principal parts of a prior art electric power steering apparatus.

The target current setting section 21 sets a target current for the motor 10 inversely proportional to a vehicle velocity VS and outputs target current signal IMS indicative of the set target current. The offset calculation section 22 calculates an offset $\Delta I$ between the target current signal I MS and a digital motor current signal IMO indicative of a motor current actually flowing through the motor 10 and supplies an offset signal $\Delta I(=IMS-IMO)$ to the PI control section 23. The control signal generation section 27 generates a PMW signal which is passed to the motor drive section 16 as motor control signal VO. The target current setting section 21, offset calculation section 22 and control signal generation section 27 are similar in construction and operation to the prior art counterparts 52, 53 and 55 shown in FIG. 7.

The PI control section 23 includes a proportioning element 24 for generating sensitivity KP to perform proportional control on the offset signal $\Delta I$, an integrating element 25 for generating integration gain KI to perform integral control on the offset signal $\Delta I$, and an adder 26 for adding together the output signals of the proportioning and integrating elements 24 and 25. More specifically, the proportioning and integrating elements 24 and 25 are connected in parallel with each other, the proportioning element 24 provides the adder 26 with proportion signal IP obtained by multiplying the offset signal $\Delta I$ by the sensitivity KP, and the integrating element 25 provides the adder 26 with integration signal II obtained by integrating the offset signal $\Delta I$ with the integration gain KI.

Further, the proportioning element 24 has an arithmetic function to multiply proportion coefficient KVP supplied from the coefficient setting section 28 by the sensitivity KP. The integrating element 25 has an arithmetic function to multiply integration coefficient KVI supplied from the coefficient setting section 28 by the integration gain KI.

The addition result of the adder 26 is delivered to the control signal generation section 27 as proportion/integration signal IPI (=IP+II). The proportion/integration signal IPI based on the proportion coefficient KVP and integration coefficient KVI may be expressed by the following equation:

$$IPI=KP*KVP* \Delta I+(KI*KVI/p)*\Delta I \qquad \text{Equation (2)}$$

As will be clear from Equation (2) above, the proportion coefficient KVP and integration coefficient KVI can be changed by multiplying the proportion coefficient KVP by the sensitivity KP and multiplying the integration coefficient KV by the integration gain KI. Also, because the proportion coefficient KVP and integration coefficient KVI are both set to vary in accordance with the vehicle velocity signal VS, the proportion/integration signal IPI can be a control amount responsive to the detected vehicle velocity.

The proportion-coefficient and integration-coefficient setting section 28 includes a memory such as a ROM which prestores therein various values of the proportion coefficient KVP and integration coefficient KVI in corresponding relations to various possible values of the vehicle velocity VS, which may be predetermined on the basis of experiments or through theoretical consideration. Upon receipt of vehicle velocity VS detected by the velocity sensor 14, the coefficient setting section 28 reads out proportion and integration coefficients KVP and KVI corresponding to the detected vehicle velocity VS and sends the coefficients KVP and KVI to the proportioning and integrating elements 24 and 25, respectively. The proportion coefficient KVP and integration coefficient KVI may be set to take a same value KV (KV=KVP=KVI) or different values.

Figure 3:
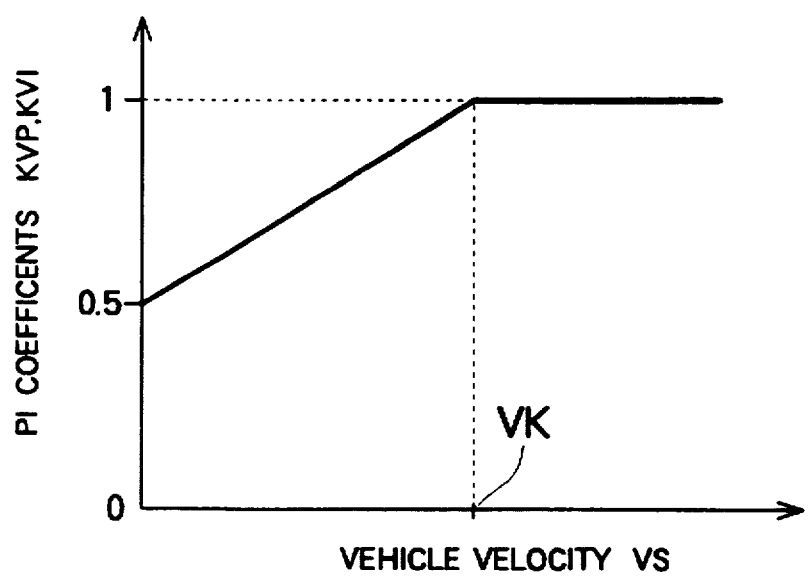
FIG. 3 is a graph showing an exemplary characteristic curve of proportion and integration coefficients versus vehicle velocity according to the present invention.

FIG. 3 is a graph showing an exemplary characteristic curve of proportion and integration coefficients KVP, KVI versus vehicle velocity VS in the embodiment. In the example of FIG. 3, the proportion and integration coefficients KVP, KVI are set to take a same value; for example, when the vehicle velocity VS is "0" (i.e., when the vehicle is not in motion), the proportion and integration coefficients KVP, KVI both take a value of "0.5".

According to the illustrated characteristic, as the vehicle velocity VS increases from a low-velocity region, the proportion and integration coefficients KVP, KVI gradually increase from "0.5". Then, once the vehicle velocity VS reaches a predetermined value VK in a high-velocity region (e.g., 20 km per hour), the proportion and integration coefficients KVP, KVI both reach a value of "1.0".

As has been described above, the electric power steering apparatus in accordance with one embodiment of the present invention is characterized by inclusion of the proportion-coefficient and integration-coefficient setting section 28 which outputs proportion and integration coefficients KVP, KVI increasing in value as the vehicle velocity increases so that the sensitivity KP and integration gain KI are limited by the coefficients KVP and KVI, respectively. With such an arrangement, the electric power steering apparatus can prevent occurrence of unwanted noises and vibrations in the vehicle steering system when the vehicle is running at a low velocity (i.e., during low-velocity running of the vehicle) and can also achieve an enhanced response of the steering system to a driver's steering operation when the vehicle is at a high velocity.

Figure 4:
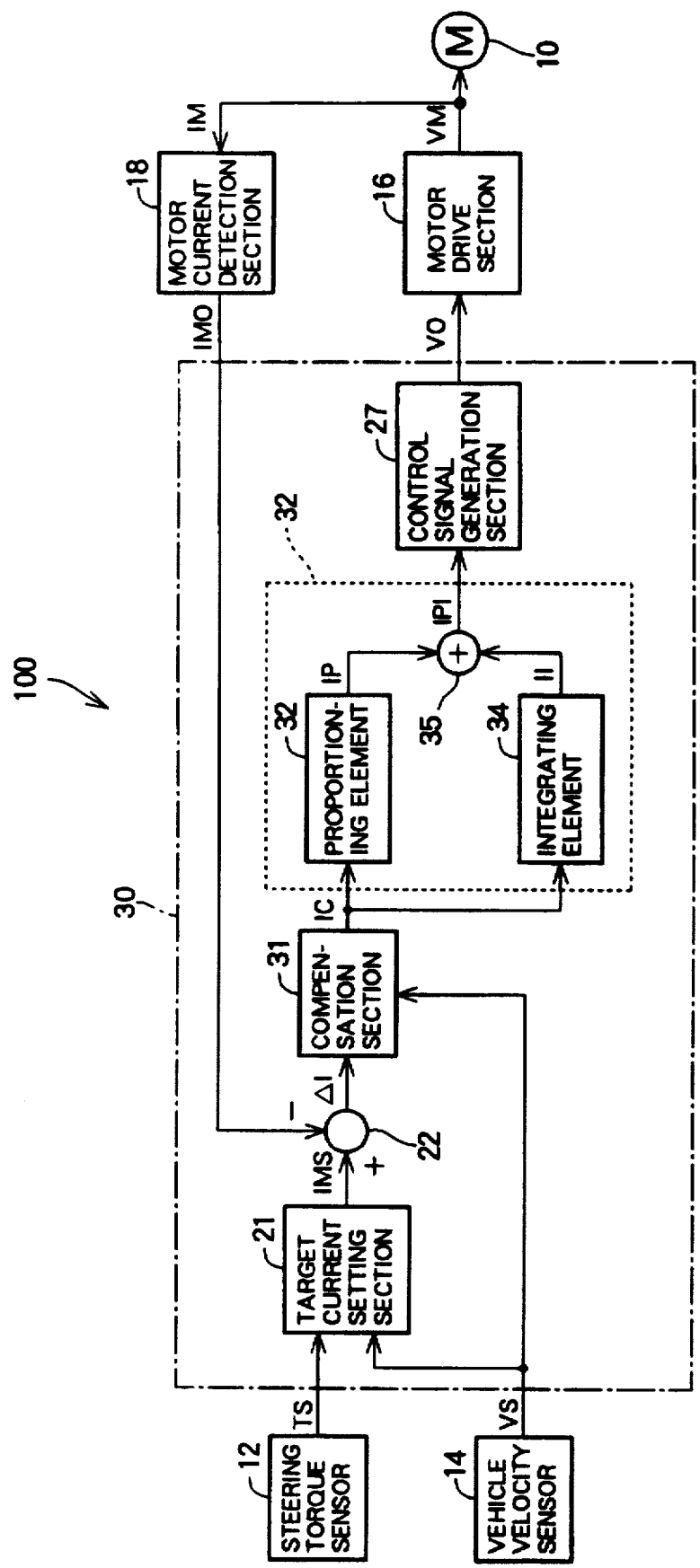
FIG. 4 is a block diagram showing principal parts of an electric power steering apparatus according to another embodiment of the present invention.

FIG. 4 is a block diagram showing principal parts of an electric power steering apparatus 100 according to another embodiment of the present invention, where control unit 30 includes a target current setting section 21, an offset calculation section 22, a compensation section 31, a PI control section 32 and a control signal generation section 27. The control unit 30 of FIG. 4 is essentially different from the control unit of FIG. 2 in that the compensation section 31 is provided in place of the proportion-coefficient and integration-coefficient setting section 28. The target current setting section 21, offset calculation section 22 and control signal generation section 27 are similar in construction and operation of the counterparts of FIG. 2 and therefore will not be described here.

The compensation section 31 has a multiplying function and includes a memory such as a ROM which prestores therein various values of compensation coefficient GH in corresponding relations to various possible values of the vehicle velocity VS, which may be predetermined on the basis of experiments or through theoretical consideration. Upon receipt of vehicle velocity VS detected by the velocity sensor 14, the compensation section 31 reads out compensation coefficient GH corresponding to the detected vehicle velocity VS and multiplies the offset signal ΔI by the read-out compensation coefficient GH (GH*ΔI) so as to supply compensated or modified offset signal A IC to the Pi control section 32.

The compensation coefficient GHA is set to increase in value as the vehicle velocity VS increases, in such a manner that the compensated offset signal ΔIC takes a small value when the vehicle is not in motion or running at a low velocity but takes a greater value when the vehicle is running at a high velocity (i.e. during high-velocity running of the vehicle).

The compensation section 31 is provided in a negative feedback loop between the offset calculation section 22 and the PI control section 32.

The compensated offset signal ΔIC output from the compensation section 31 is passed to the PI control section 32, where the signal ΔIC is subjected to an arithmetic operation, as expressed in Equation 1 above, which is performed in this embodiment by proportioning and integrating elements 33 and 34 and adder 35. Proportion/integration signal IPI can be expressed by $$IPI = KP * \Delta IC + (KI/p) * \Delta IC \qquad \text{Equation (3)}$$
$$= KP * GH * \Delta I + (KI * GH/p) * \Delta I,$$

where "p" is a Heaviside operator.

If the compensation coefficient GH is set to equal the sensitivity KVP and integration coefficient KVI (GH=KVP= KVI), Equation (3) can be equivalent to Equation (2), so that by varying the compensation coefficient GH in accordance with the vehicle velocity VS, a steering characteristic responsive to the vehicle velocity VS can be obtained over a range from the low-velocity through the high-velocity region.

Figure 5:
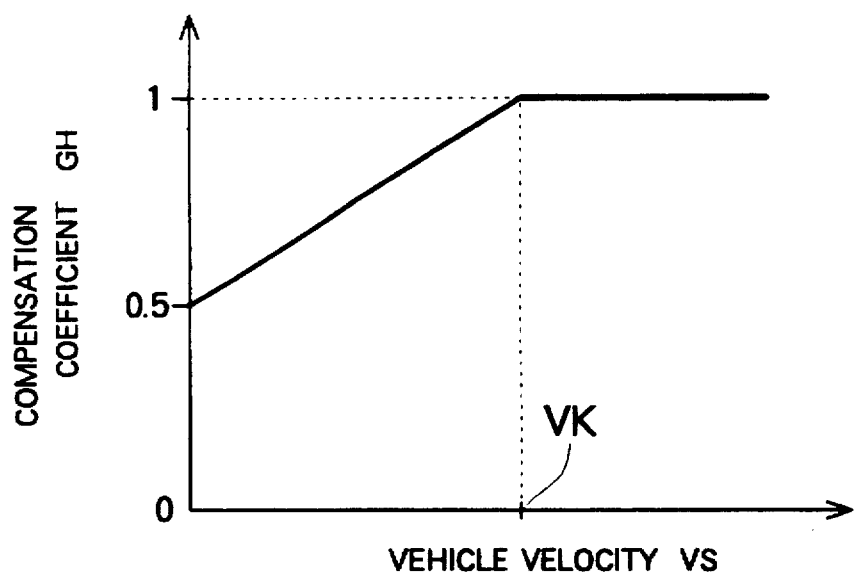
FIG. 5 is a graph showing an exemplary characteristic curve of compensation coefficient versus vehicle velocity according to the present invention.

FIG. 5 is a graph showing an exemplary characteristic curve of compensation coefficient GH versus vehicle velocity VS according to the present invention. According to the illustrated characteristic, as the vehicle velocity VS increases from the low-velocity region, the compensation coefficient GH gradually increases from "0.5". Then, once the vehicle velocity VS reaches a predetermined value VK in the high-velocity region (e.g., 20 km per hour), the compensation coefficient GH takes a value of "1.0".

Figure 8:
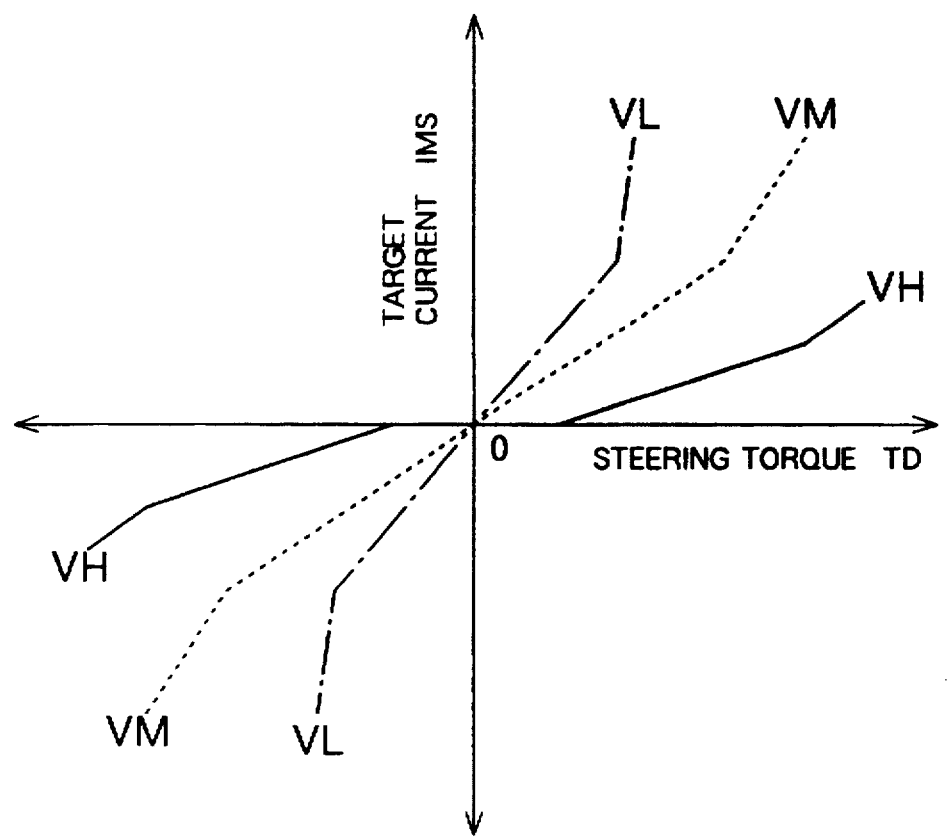
FIG. 8 is a graph showing an exemplary characteristic curve of target current signal versus steering torque signal in the prior art apparatus, which is plotted with vehicle velocity used as a parameter.

When the vehicle is running at a low velocity, the target current signal IMS is set to a sufficiently great value in such a manner that the motor 10 is driven by a sufficiently great motor current IM as shown in FIG. 8, and thus a sufficient steering assist can be applied to the steering system. Also, when the vehicle is running at a low velocity, the compensation coefficient GH is set to a small value in the compensation section 31 (GH=0.5) and gain in the control system including the PI control section 32 is made small, so that it is possible to prevent occurrence of noises and vibrations although the steering response may be sacrificed to some degree.

On the other hand, when the vehicle is at a high velocity, the target current signal IMS is set to a small value in such a manner that the motor 10 is driven by a small motor current IM, and thus, a small steering assist is applied to the steering system, achieving a stabilized steering during high-velocity running of the vehicle. Also, when the vehicle is at a high velocity, the compensation coefficient GH is set to a greater value in the compensation section 31 (GH=1.0) and gain in the control system including the PI control section 32 is made greater, so that it is possible to enhance the steering response.

Figure 9:
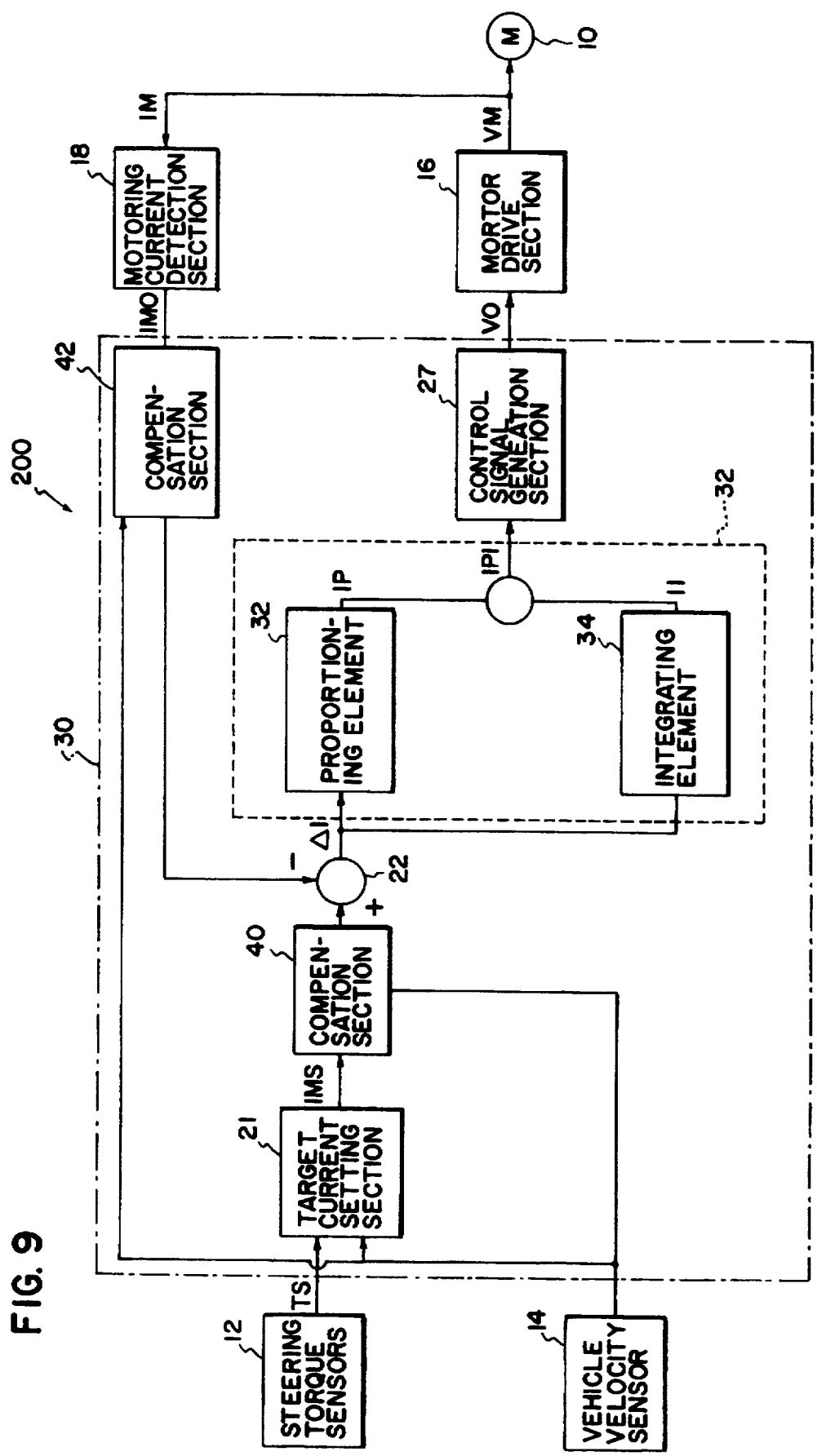
FIG. 9 is a block diagram showing principal parts of an electric power steering apparatus according to another embodiment of the present invention.

According to a modification of the electric power steering apparatus 100 of FIG. 4, the compensation section 31 provided between the offset calculation section 22 and the PI control section 32 may be eliminated; instead, two compensation sections, similar in construction to the compensation section 31, may be provided. This modified power steering apparatus 200 is shown in FIG. 9. A first compensation section 40 may be provided between the target current setting section 21 and the offset calculation section 22. A second compensation section 42 may be provided between the motor current detection section 18 and the offset calculation section 22. In this modification, the control unit 30 supplies the offset calculation section 22 with target current signal IMS and motor current signal IMO after having multiplied these signals IMS and IMO by compensation coefficient GH of FIG. 5.

Because offset ΔI is calculated, by the offset calculation section 22, from the target current signal IMS and motor current signal IMO multiplied by compensation coefficient GH and the thus-calculated offset signal ΔI(=GH *IMS–GH*IMO) is supplied to the PI control section 32, the same proportion/integration signal IPI as calculated by Equation (3) is obtained, thus resulting in the same operation as in FIG. 4.

Figure 6:
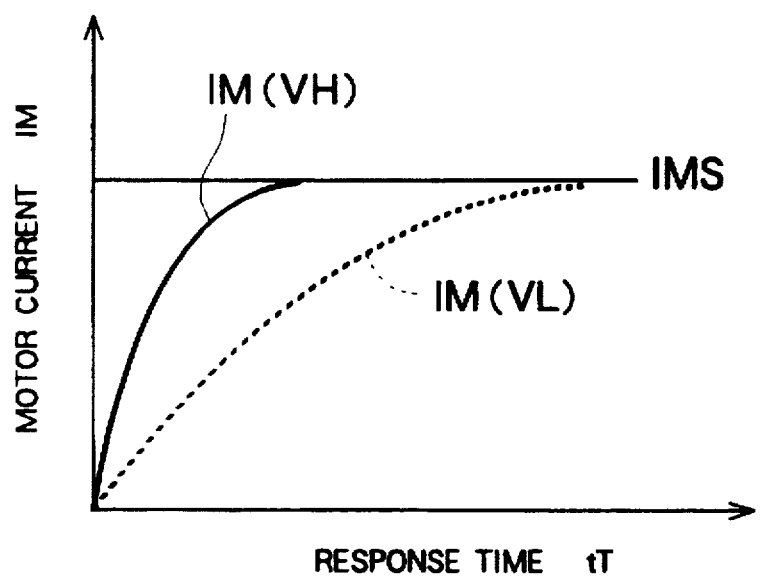
FIG. 6 is a graph showing an exemplary characteristic curve of steering response in the electric power steering apparatus of the present invention.

FIG. 6 is a graph showing an exemplary characteristic curve of steering response in the electric power steering apparatus of the present invention, where the steering response is expressed in terms of response time tT when motor current IM comes to equal target current signal IMS. As shown, the response time tT is relatively long when the vehicle is running at a low velocity (VL); however, when the vehicle is running at a high velocity (VL), the response time tT is shorter, achieving an enhanced steering response.

To summarize, the electric power steering apparatus according to the present invention is characterized in that, on the basis of a velocity detected by the velocity sensor, the proportion-coefficient and integration-coefficient setting section sets sensitivity of the proportioning element and integration gain of the integrating element in such a manner that the sensitivity and integration gain take greater values during high-velocity running of the vehicle than during low-velocity running of vehicle. With this feature, the present invention can prevent occurrence of unwanted noises and vibrations during low-velocity running of the vehicle and also achieve an enhanced steering response during high-velocity running of the vehicle, thus always providing an optimum steering feeling in various running conditions of the vehicle.

Further, the electric power steering apparatus according to the present invention is also characterized in that the control unit includes, in place of the proportion-coefficient and integration-coefficient setting section, a compensation section provided between the offset calculation section and the proportional and integral control section and that the compensation section modifies the offset signal output from the calculation section, on the basis of the velocity detected by the velocity sensor, in such a manner that the offset signal takes a greater value during high-velocity running of the vehicle than during low-velocity running of vehicle. The electric power steering apparatus according to the present invention is also characterized in that two compensation sections are provided between the target current setting section and the offset calculation section and between the motor current detection section and the offset calculation section, and that the compensation sections modify the target current signal and motor current signal, on the basis of the velocity detected by the velocity sensor, in such a manner that these signals take greater values during high-velocity running of the vehicle than during low-velocity running of vehicle. With these arrangements based on the compensation section or sections as well, it is possible to prevent occurrence of unwanted noises and vibrations during low-velocity running of the vehicle and also enhance a steering response during high-velocity running of the vehicle, and an optimum steering feeling can be achieved in changing running conditions of the vehicle.

What is claimed is:

1. An electric power steering apparatus for use with an automotive vehicle comprising:

a steering torque sensor for detecting steering torque caused by a steering system of the vehicle;

a velocity sensor for detecting a velocity of the vehicle;

an electric motor for applying a steering assist to the steering system; and a control unit including a target current setting section for, on the basis of the steering torque detected by said steering torque sensor, setting a target current to drive said motor, a motor current detection section for detecting a motor current actually flowing through said motor, and a proportional and integral control section having proportioning and integrating elements for controlling said motor on the basis of an offset between the target current set by said setting section and the motor current detected by said motor current detection section, said control unit further including a proportion-coefficient and integration-coefficient setting section for, on the basis of the velocity detected by said velocity sensor, setting sensitivity of said proportioning element and integration gain of said integrating element in such a manner that said sensitivity and integration gain take greater values during high-velocity running of the vehicle than during low-velocity running of vehicle.

2. An electric power steering apparatus as defined in claim 1 wherein said proportion-coefficient and integration-coefficient setting section sets the proportion and integration coefficients that vary in response to the velocity detected by said velocity sensor.

3. An electric power steering apparatus for use with an automotive vehicle comprising:

a steering torque sensor for detecting steering torque caused by a steering system of the vehicle;

a velocity sensor for detecting a velocity of the vehicle;

an electric motor for applying a steering assist to the steering system; and a control unit including a target current setting section for, on the basis of the steering torque detected by said steering torque sensor, setting a target current to drive said motor, a motor current detection section for detecting a motor current actually flowing through said motor, an offset calculation section for calculating an offset between the target current set by said setting section and the motor current detected by said motor current detection section and outputting an offset signal indicative of the calculated offset, and a proportional and integral control section having proportioning and integrating elements for controlling said motor on the basis of the offset signal, said control unit further including a compensation section provided between said offset calculation section and said proportional and integral control section for modifying the offset signal, on the basis of the velocity detected by said velocity sensor, in such a manner that said offset signal takes a greater value during high-velocity running of the vehicle than during low-velocity running of vehicle.

4. An electric power steering apparatus as defined in claim 3 wherein said compensation section generates a compensation coefficient that varies in response to the velocity detected by said velocity sensor.

5. An electric power steering apparatus for use with an automotive vehicle comprising:

a steering torque sensor for detecting steering torque caused by a steering system of the vehicle;

a velocity sensor for detecting a velocity of the vehicle;

an electric motor for applying a steering assist to the steering system; and a control unit including a target current setting section for, on the basis of the steering torque detected by said steering torque sensor, setting a target current signal to drive said motor, a motor current detection section for detecting a motor current actually flowing through said motor to generate a motor current signal indicative of the detected motor current, an offset calculation section for calculating an offset between the target current set by said setting section and the motor current detected by said motor current detection section and outputting an offset signal indicative of the calculated offset, and a proportional and integral control section including proportioning and integrating elements for controlling said motor on the basis of the offset signal, said control unit further including a first compensation section provided between said target current setting section and said offset calculation section and a second compensation section provided between said motor current detection section and said offset calculation section, said first and second compensation sections modifying the target current signal and motor current signal, on the basis of the velocity detected by said velocity sensor, in such a manner that the target current signal and motor current signal take greater values during high-velocity running of the vehicle than during low-velocity running of vehicle.

6. An electric power steering apparatus as defined in claim 5 wherein said first and second compensation sections generate compensation coefficients that vary in response to the velocity detected by said velocity sensor.

* * * * *

UNITED STATES PATENT AND TRADEMARK OFFICE
CERTIFICATE OF CORRECTION

PATENT NO. : 5,788,010

DATED : AUGUST 4, 1998

INVENTOR(S) : MUKAI ET AL.

It is certified that error appears in the above-identified patent and that said Letters Patent is hereby corrected as shown below:

Col. 2, line 16: "motor" should read —motor 10—

Col. 2, line 23: "Pi" should read —PI—

Col. 2, line 43: "(ΔI=1)" should read —(ΔI=0)—

Col. 6, line 9: "AI" should read —ΔI—

Col. 6, line 9: "I MS" should read —IMS—

Col. 7, line 59: "A IC" should read —ΔIC—

Col. 7, line 59: "Pi" should read —PI—

Signed and Sealed this

Ninth Day of November, 1999

*Attest:*

Q. TODD DICKINSON

*Attesting Officer*     Acting Commissioner of Patents and Trademarks